United States Patent
Grundvig

(10) Patent No.: US 6,867,617 B2
(45) Date of Patent: Mar. 15, 2005

(54) HALF-RATE CLOCK LOGIC BLOCK AND METHOD FOR FORMING SAME

(75) Inventor: Jeffrey Paul Grundvig, Loveland, CO (US)

(73) Assignee: Agere Systems Inc., Allentown, PA (US)

( * ) Notice: Subject to any disclaimer, the term of this patent is extended or adjusted under 35 U.S.C. 154(b) by 52 days.

(21) Appl. No.: 10/623,303

(22) Filed: Jul. 18, 2003

(65) Prior Publication Data

US 2005/0012523 A1 Jan. 20, 2005

(51) Int. Cl.[7] ........................ H03K 19/173; H03K 19/00
(52) U.S. Cl. ........................................ 326/46; 326/93
(58) Field of Search ............................... 326/46, 37, 40, 326/93; 327/141

(56) References Cited

U.S. PATENT DOCUMENTS

| 5,301,196 | A | | 4/1994 | Ewen et al. | |
|---|---|---|---|---|---|
| 5,440,245 | A | * | 8/1995 | Galbraith et al. | ............. 326/38 |
| 6,133,758 | A | * | 10/2000 | Durham et al. | ............... 326/93 |
| 6,515,504 | B1 | * | 2/2003 | Carro | ........................... 326/37 |

* cited by examiner

*Primary Examiner*—James H. Cho

(57) ABSTRACT

A method and apparatus for converting a full-rate digital clock circuit to a fractional-rate clock circuit. The combinatorial and sequential functions of the full rate design are duplicated, with a first combinatorial function responsive to even input logic vectors and a second combinatorial function responsive to odd input logic vectors. Output vectors from the first and the second combinatorial function are provided as input vectors to the respective first and second sequential function, which operate at a fractional clock rate and provide the output block vectors.

23 Claims, 7 Drawing Sheets

HALF-RATE CLOCK LOGIC BLOCK AND METHOD FOR FORMING SAME

FIELD OF THE INVENTION

The present invention relates to combinatorial and sequential logic circuits, and more particularly to combinatorial and sequential logic circuits operating at a fractional clock rate.

BACKGROUND OF THE INVENTION

Combinatorial logic devices produce one or more output signals in response to logical combinations of one or more input signals. Thus, combinatorial networks can function to indicate the presence of a given set of input signals by producing a corresponding output signal. Decoders, adders, logic gates and shifters are examples of combinatorial logic networks. A simple exemplary decoder produces an output signal indicating the state of two input variables. Since there are four possible combinations of two binary input variables, the input state can be determined by a decoder capable of producing one of four output signals. The output signal thus indicates or decodes the input state. Combinatorial networks are conventionally built from basic logic circuits including AND gates, OR gates, inverters, etc.

Sequential logic circuits (or register logic circuits) produce an output signal in response to one or more input signals and a clock trigger signal. These synchronous circuits are typically constructed from basic flip-flops, that change state only at the active edge of a clock signal (where the active edge can be the leading clock edge or the lagging clock edge). Synchronous flip-flops and registers are examples of sequential networks. The clock signal synchronizes the operation of sequential networks by triggering registers and latches and advancing flip-flops.

Most conventional digital systems are designed to operate at a so-called full clock rate equal to the data rate. These synchronous circuits are triggered by the active edge of the clock signal. Each synchronous circuit has a known set up and hold time, representing the time during which the input signal must remain constant, both before and after the active clock edge, so that the circuit can perform its intended operation in response to the input signal. However, clock speeds are ever increasing in response to requirements for faster processing of digital data. As the period of each clock cycle decreases, there may be insufficient time for a circuit element (such as a gate) to perform its function during the interval between the active edge of two successive clock cycles. That is, when the clock period is less than the combined set up and hold time of a synchronous circuit element the output signal maybe erroneous.

To overcome this difficulty, circuit designers convert the full-rate digital design to a half-rate clock design. The half-rate design runs at half the original clock frequency (thus the clock period is doubled), but performs twice the number of data processing steps during each clock cycle, so that the output signals are equivalent to and occur at the same time as the full-rate design. To perform at the doubled rate, the half-rate design typically includes twice the number of circuit elements as the full-rate circuit, including both the registered or sequential logic elements and the non-registered or combinatorial logic elements.

The conversion process from the full rate to the half-rate design can be a time consuming task Control circuits or other circuits having a considerable number of full-rate feedback paths can be difficult to convert to a half-rate system. For example, converting a full-rate state machine to half-rate operation is a complex and time-consuming process, since there are a plurality of states and each state has several feed-forward paths. Doubling the circuit elements so that operation at half-rate produces output signals that are time-coincident with a full rate clock must account for these various states and their feed forward paths to the next state.

The conversion process is essentially ad hoc, relying primarily on the skill level and knowledge of the circuit designer. Thus the results of the conversion process often vary considerably in terms of the circuit area consumed on an integrated circuit device in which the design is implemented, power consumption, and overall effectiveness of the half-rate design when compared with its full-rate counterpart.

BRIEF SUMMARY OF THE INVENTION

The present invention describes a fractional-rate clocked logic circuit or logic block and a method for converting a full-rate clocked logic circuit to a fractional-rate clocked logic circuit. The full-rate clocked logic circuit comprises combinatorial functions and sequential functions for operating on block input signals to produce block output signals, wherein the sequential functions operate at a full-rate clock frequency. The method comprises deriving combinatorial logic elements based on the combinatorial functions, wherein each of the combinatorial logic elements is responsive to a subset of the block input signals, for producing combinatorial signals. The method further comprises deriving sequential logic elements based on the sequential functions, where each of the sequential logic elements is responsive to a subset of the combinatorial signals and a fractional clock signal, for producing register signals. A frequency of the fractional clock signal is a fraction of the full-rate clock frequency. At least one of the sequential logic elements further produces a register feedback signal. Certain of the combinatorial logic elements are further responsive to a subset of the combinatorial signals, and at least one of the combinatorial logic elements is further responsive to the register feedback signal. The register signals are combined for producing the block, output signals.

The logic block processes input signals for producing output signals. The block comprises a deinterleaver for receiving and deinterleaving the input signals into a plurality of input signal groups and a plurality of combinatorial function elements each one for receiving one of the plurality of input signal groups for producing a combinatorial signal. A plurality of sequential function elements each receive a combinatorial signal group and a clock signal for producing a register signal. At least one of the plurality of sequential function elements produces a register feedback signal. Each one of the plurality of combinatorial function elements further receives one of the combinatorial signals, and at least one of the plurality of combinatorial function elements receives the register feedback signal. An interleaver is responsive to the register signals for producing the output signals.

BRIEF DESCRIPTION OF THE DRAWINGS

The present invention will be more easily understood and the advantages and uses thereof more readily apparent when considered in view of the following detailed description of the invention when read in conjunction with the following figures wherein.

In accordance with common practice, the various features of the present invention are not drawn to scale, but are drawn to emphasize specific features relevant to the invention. Reference characters denote like elements throughout the firs and text.

DETAILED DESCRIPTION OF THE INVENTION

Figure 1:
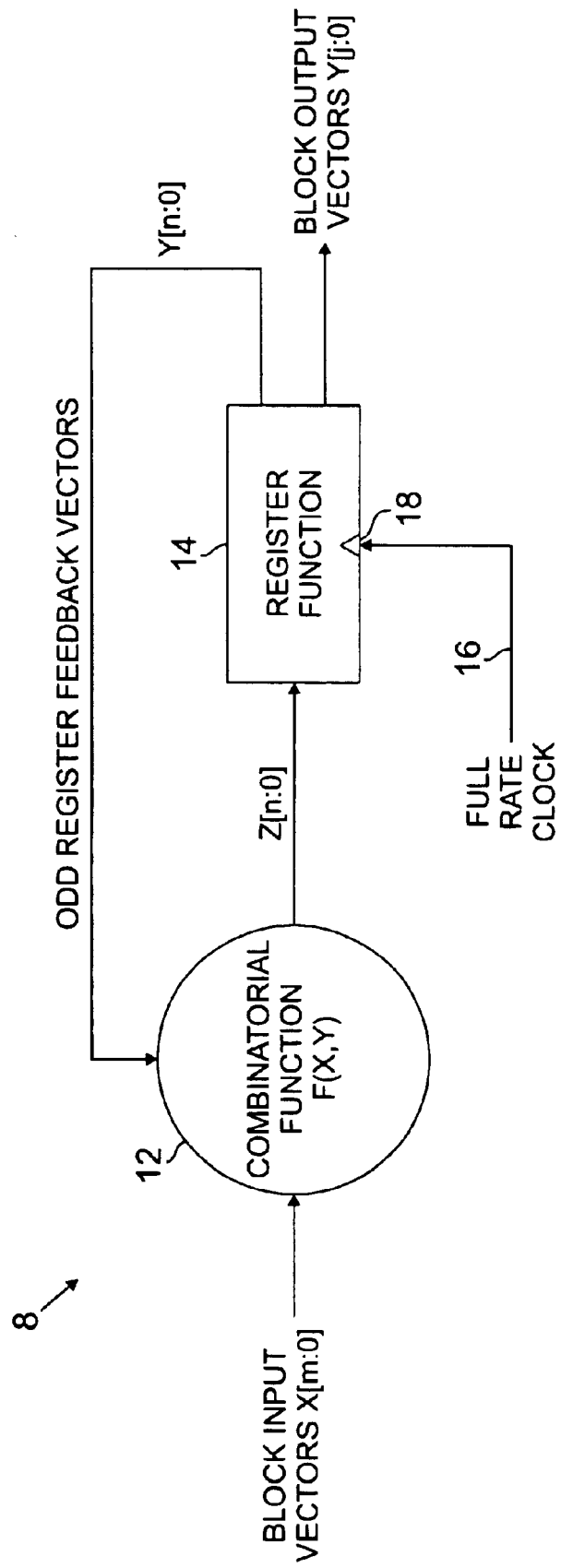
FIG. 1 is a block diagram of a prior art full-rate clock digital circuit including combinatorial and register circuit functions.

Before describing in detail the particular half-rate clock digital circuitry and the method for converting a full-rate clock digital circuit to a half-rate clock circuit in accordance with the present invention, it should be observed that the present invention resides primarily in a novel and non-obvious combination of elements and method steps. Accordingly, these elements and steps have been represented by conventional elements in the drawings, showing only those specific details that are pertinent to the present invention so as not to obscure the description with structural details that will be readily apparent to those skilled in the art having the benefit of the description herein.

FIG. 1 illustrates a prior art full-rate clock logic block 8 comprising a combinatorial function 12 and a register function 14 (also referred to as a sequential function). A plurality of m+1 logic signals (designated 0, 1, 2 . . . m) comprise a signal vector X (designated X[m:0], input to the combinatorial function 12 and processed in conjunction with a signal vector of Y logic signals according to a defining function F(X, Y) to produce an output signal vector Z[n:0] that is in turn provided as an input to the register function 14. Note X designates one or more logic signals or bits originating from a prior circuit element, and Y designates one or more logic signals or bits fed back from another circuit element (such as the register function 14).

The register function 14 is responsive to a full-rate clock signal 16 at a clock terminal 18 for controlling the synchronous operation thereof. The register function 14 provides both a register feedback vector (designated Y[n:0]) and a block output vector (designated Y[j:0]), which is a subset of the register feedback vector. The register feedback vector Y[n:0] is provided as a feedback input to the combinatorial function 12 as described to above.

As applied to digital systems, the combinatorial function 12 represents one or more combinatorial digital functions, for example, a multiplier, shifter, adder, state encoder, or any combination of such elements, and is described by the function F(X,Y) operating on the two input vectors, the block input vector x[m:0] and the register feedback vector Y[n:0]. Likewise, the register function 14 represents one or more known synchronous circuit elements. By appropriately segregating the combinatorial and the sequential circuit elements of a digital system, most digital systems can be represented as a cascade of the full-rate clock logic block 8 of FIG. 1. In the cascade configuration the register block output vectors Y[j:0] of block "p" are provided as inputs to a block "p+1". Typically, the combinatorial functions of each cascaded block are implement different logic functions.

Figure 2:
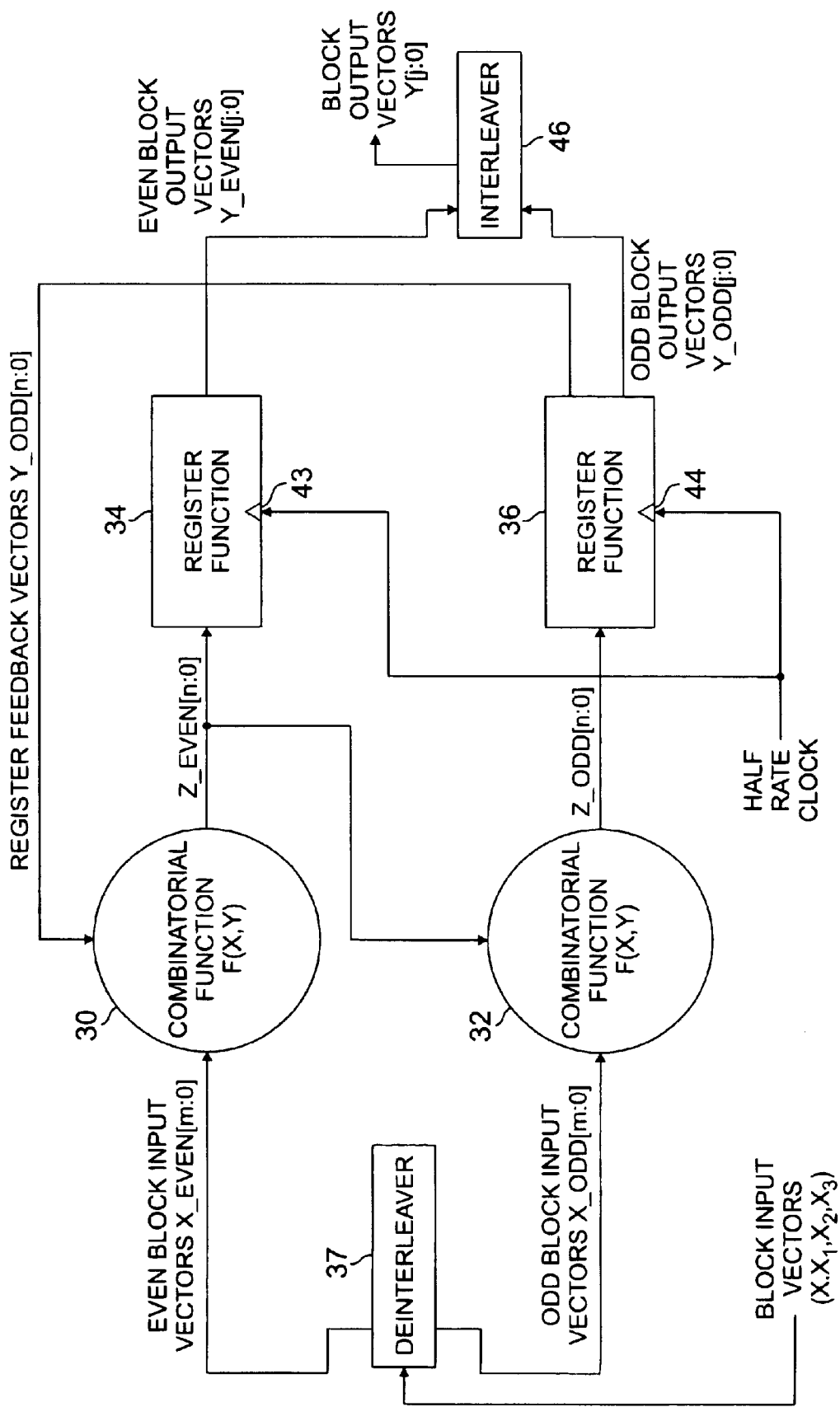
FIG. 2 is a block diagram of a half-rate clock digital circuit implementing the function of the full-rate clock digital circuit of FIG. 1 according to the teachings of the present invention.

FIG. 2 illustrates a half-rate clock logic circuit or block constructed according to the teachings of the present invention, comprising combinatorial functions 30 and 32 and register functions 34 and 36. In converting the full-rate clock design of FIG. 1 to the half-rate clock design of FIG. 2, according to the teachings of the present invention the combinatorial function 12 of FIG. 1 is duplicated and represented by the combinatorial functions 30 and 32 of FIG. 2. That is, the function F(X,Y) for the combinatorial function 12 is implemented in both the combinatorial functions 30 and 32. The register functions 36 in the half-rate design is identical to the register function 14 in the full-rate design. The register function 34 is identical to the register function 14 with the exception that the register function 34 excludes the registers that generate feedback signals.

Figure 3:
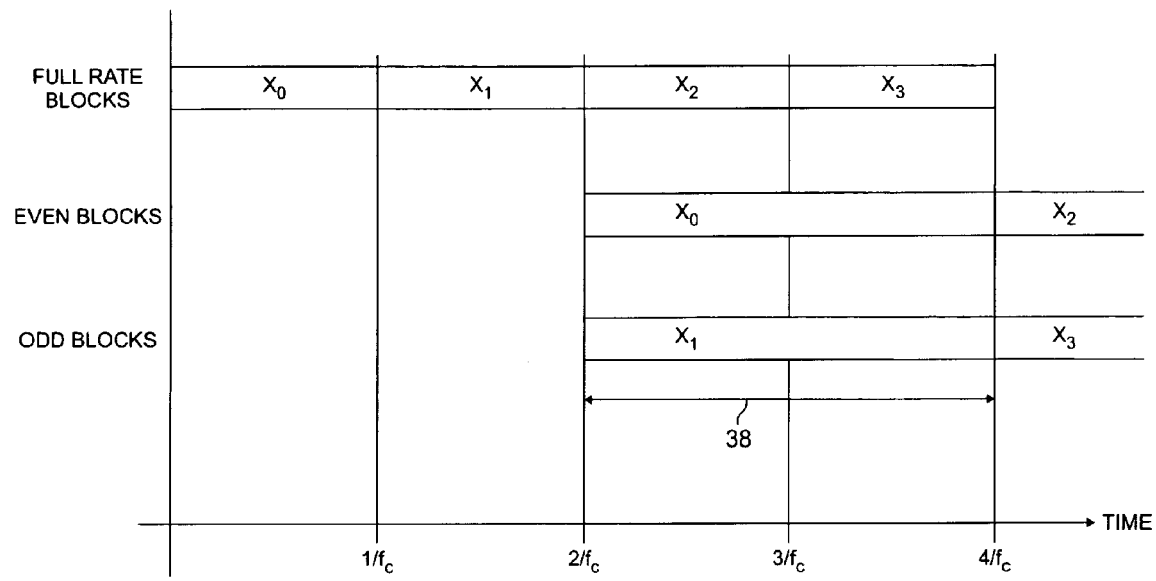
FIG. 3 is a timing diagram illustrating certain operating principles of the half-rate clock digital circuit of FIG. 2.

With reference to FIG. 1, the serial stream of block input vectors X[m:0] is segregated (deinterleaved) into X_even and X_odd vectors (or signal groups) by a deinterleaver 37. With reference to FIG. 3, the deinterleaver 37 receives one X[m:0] block input vector (for example, $X_0$, $X_1$, $X_2$, $X_3$) during successive full-rate clock periods, where the full-rate clock frequency is designated $f_c$ and thus the full-rate clock period is $1/f_c$ as labeled on the time axis. Two consecutive block vectors $X_0$, $X_1$ are output from the deinterleaver 37 during a single half-rate clock duration 38, where a half-rate clock cycle duration is equivalent to two full rate clock cycles as shown. $X_0$, received first in time, is identified as the X_even block vector, and $X_1$, the block vector received second in tine, is identified as the X_odd block vector. During the next two half-rate clock cycles the block vectors $X_2$, $X_3$ are output from the deinterleaver 37 as shown.

Returning to FIG. 2, the X_even[m:0] vectors are supplied as inputs to the combinatorial function 30. The odd vectors, designated X_odd[m:0], are supplied as inputs to the combinatorial function 32. The combinatorial function 30 produces Z_even[n:0] output vectors that are input to the register function 34 and to the combinatorial function 32. The combinatorial function 32 produces Z_odd [n:0] output vectors that are provided as inputs to the register function 36.

The register function 34 provides even block output vectors Y_even[j:0]. Odd block output vectors Y_odd[j:0] are produced by the register function 36. The combination of the even and the odd block output vectors is equivalent to the block output vectors produced by the register function 14 in the full-rate clock circuit of FIG. 1. Additionally, the register function 36 produces odd register feedback vectors Y_odd [n:0] that are supplied as input signals to the combinatorial function 30 for operation according to the function F(X,Y). The odd register feedback vectors Y_odd[n:0] include all output vectors from the register function 36, while the odd block output vectors Y_odd[j:0] are a subset of the feedback signals. As can be seen, a half-rate clock signal, operating at a frequency of one-half the full-rate clock, is supplied as a clocking input to the clock input terminals 43 and 44 of the register functions 34 and 36 respectively.

The Y_even and Y_odd block output vectors from the register functions 34 and 36, respectively, can be combined by interleaving (that is, by selecting the first Y-even output vector then the first Y_odd output vector, followed by the second Y_even output vector, etc.) in an interleaver 46 to produce the same composite block output vectors as provided by the full-rate clock register function 14 of FIG. 1. Note that the half-rate clock outputs are produced two at a time during each half-rate cycle (prior to interleaving), as compared to one at a time during each full-rate clock cycle of the FIG. 1 prior art circuit.

According to the teachings of the present invention, a full rate clock circuit, such as that illustrated in FIG. 1, can be converted to a half-rate clock circuit, such as that illustrated in FIG. 2, according to the following steps.

1. Identify the block input signal vectors (X[m:0]), register input signal vectors (Z[n:0]), register feedback signal vectors (Y[n:0]), and block output signal vectors (Y[j:0]).
2. Select alternating block input signals from the full-rate clock design, designated X_even[m:0], and provide them as inputs to a first (even) combinatorial function (such as the combinatorial function 30 of FIG. 2), which has the same controlling function (F(X,Y)) as the combinatorial function of the full-rate design.
3. Provide the alternating full-rate block input signal vectors, designated X_odd[m:0], as input signals to a second (odd) combinatorial function, such as the combinatorial function 32 of FIG. 2, which implements the same function F(X,Y) as the full-rate clock combinatorial function. When considered with reference to the serial block input signal vectors of the full-rate design, each of the X_odd input signal vectors is sequentially later in time than the corresponding X_even input signal vectors.
4. Supply the combinatorial output vectors Z_even[n:0] from the first (even) combinatorial function as input signal vectors to a first (even) register function, such as the register function 34.
5. Supply the combinatorial output signal vectors from the second (odd) combinatorial function (Z_odd[n:0]) as inputs to a second (odd) register function, such as the register function 36.
6. Supply the Y_odd[n:0] register feedback signal vectors (from the second (odd) register function) as inputs to the first (even) combinatorial function.
7. Supply the Z_even[n:0] combinatorial output signal vectors from the first (even) combinatorial function as inputs to the second (odd) combinatorial function.
8. Combine, by interleaving, the Y_even[j:0] and the Y_odd[j:0] block output signal vectors from the register functions to produce a composite Y[j:0] output signal vector, which is identical to the output signal vector from the register function of the full-rate circuit.

The above-described procedure for converting from a full-rate clock to a half-rate clock digital logic circuit can be used in conjunction with digital circuitry sharing a common clock. The resulting half-rate circuit reduces power consumption.

Use of the half-rate clock circuit can also improve throughput if the clock frequency is increased from the design value, as the full-rate circuit will fail to meet the timing requirements of an increased clock rate before the half-rate clock circuit will fail. That is, the half-rate circuit has the potential to provide more throughput because the half-rate clock can be operated faster than one-half of the maximum full-rate clock frequency without exceeding the timing limitations of the register elements. In the embodiment where the half-rate clock frequency is exactly one-half the full-rate clock frequency, both circuits have the same throughput. This is possible because in the half-rate circuit, although the duration of the combinatorial operations is doubled as the output vectors from one combinatorial function (the combinatorial function 30) are supplied as inputs to the other combinatorial function (the combinatorial function 32), the register set-up and hold tires (the registers 34 and 36) are not doubled. For example, assume the combinatorial function of a full-rate circuit takes 8 ns from input to output, and the register functions consume 2 ns for the set up and hold operations. Thus the full rate operation speed is limited to 8+2=10 ns. If the circuit is operated at this maximum possible speed a new output signal vector is produced every 10 ns. For the half-rate circuit, the two combinatorial functions operate in series, and assuming the same set-up and hold times for the register functions, two half-rate outputs are produced every 8+8+2=18 ns, or one output signal vector every 9 ns. Thus, the half-rate circuit exhibits better circuit speed than the full-rate case. In practice, further improvements can be realized by combining and optimizing the two even and odd combinatorial functions 30 and 32 using available synthesis tools. The resulting optimized combinatorial functions would be expected to operate faster than combined the 8+8=16 ns.

As can be seen from FIG. 2, the register function 34 provides only the even block output signal vectors Y_even [j:0], whereas the register function 36 provides both odd register feedback signal vectors (Y_odd[n:0]) and odd register block output signal vectors (Y_odd[j:0]). Typically the number of register block output signals is considerably less than the number of register feedback signals. For example, for a block comprising a 10-bit shift register, there are nine feedback signals but only one output vector.

Figure 4:
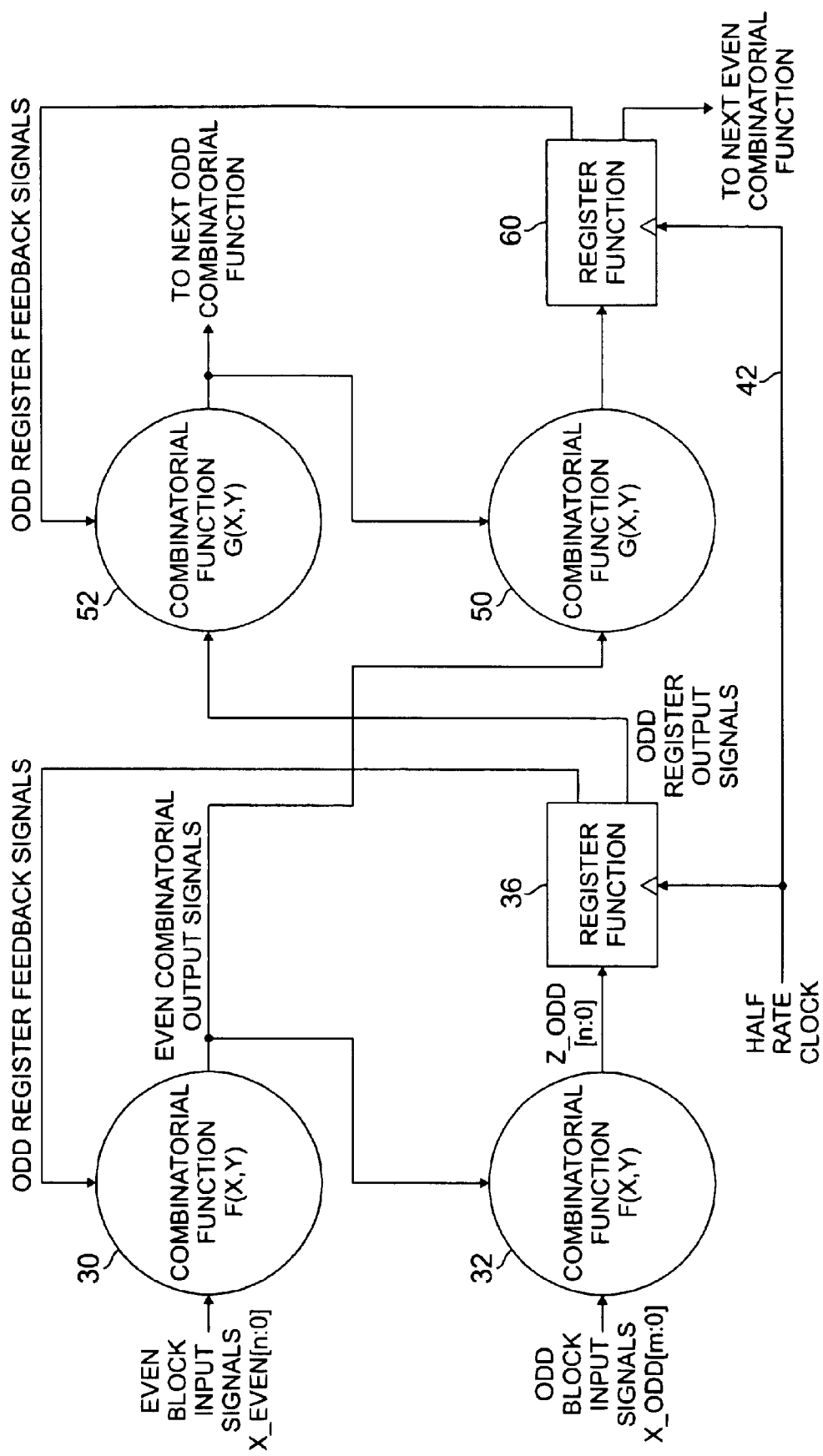
FIG. 4 is a block diagram of a cascaded half-rate clock digital circuit.

The fact that the even register function 34 does not supply feedback vectors to other elements of the block can be advantageously employed in a cascaded logic circuit design comprising several stages of odd and even combinatorial and register functions. Such an embodiment is illustrated in FIG. 4, where even and odd block input signal vectors (X_even[m:0] and X_odd[m:0] are provided to the combinatorial functions 30 and 32 as in FIG. 2. Also, the feedback signal vectors provided as inputs to the combinatorial functions 30 and 32 are identical to the feedback signal vectors of the FIG. 2 embodiment.

In the cascaded design of the FIG. 4, even combinatorial output signal vectors from the combinatorial function 30 are supplied directly as input vectors to an odd combinatorial function 50. Thus the register function 34 of FIG. 2 is not present, saving power and reducing device size.

Continuing with the FIG. 4 cascaded embodiment, the odd register output vectors from the register function 36 are provided as combinatorial inputs to an even combinatorial function 52. The even combinatorial output vectors therefrom are supplied as inputs to the combinatorial function 50 and are also supplied as inputs to the next odd combinatorial function in the cascade.

The odd combinatorial output vectors from the odd combinatorial function 50 are supplied as input vectors to a register function 60, for producing odd register feedback vectors that are provided as an input to the combinatorial function 52, and for producing odd register output vectors that are supplied as input vectors to the next even combinatorial function (not shown) in the cascade chain. Thus to continue with the cascade of circuit elements, additional half-rate clock blocks (comprising an even and an odd combinatorial function and an odd register function) can be added to the cascaded design of FIG. 4. In the circuit illustrated in FIG. 4, since a half-rate register is not present in the first stage, the half-rate clock design has the same number of register elements as the full-rate clock design, saving both circuit area and power.

Note also that the FIG. 3 cascade structure adds no additional latency when the half-rate blocks are combined. Typically, according to the prior art, when half-rate blocks are cascaded each stage adds one full-rate clock cycle of latency when compared with the full rate structure.

Recent studies of high-speed circuit designs have suggested that the power dissipation of the clock network in some cases is approaching 50 percent of the total circuit power consumption. According to the teachings of the present invention, the clock power consumption is reduced by a factor of two, since the clock is driving the same number of circuit elements at half the original clock frequency.

Figure 5:
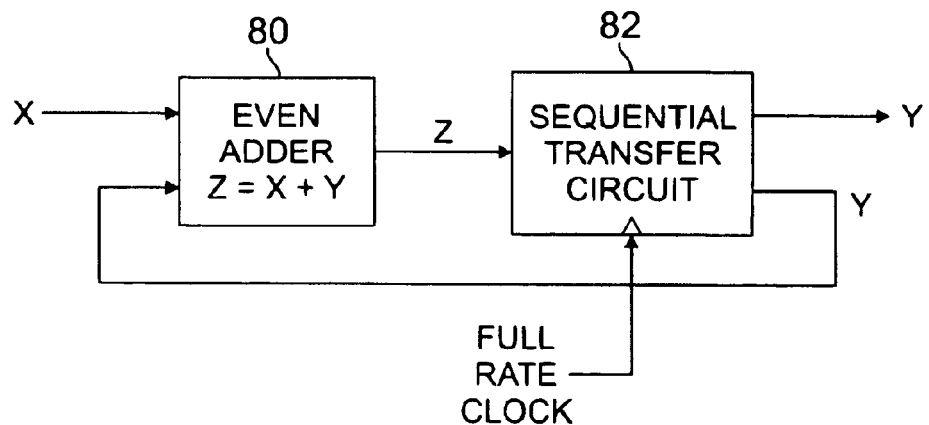
FIG. 5 is a block diagram of an exemplary prior art full-rate clock digital circuit.
Figure 6:
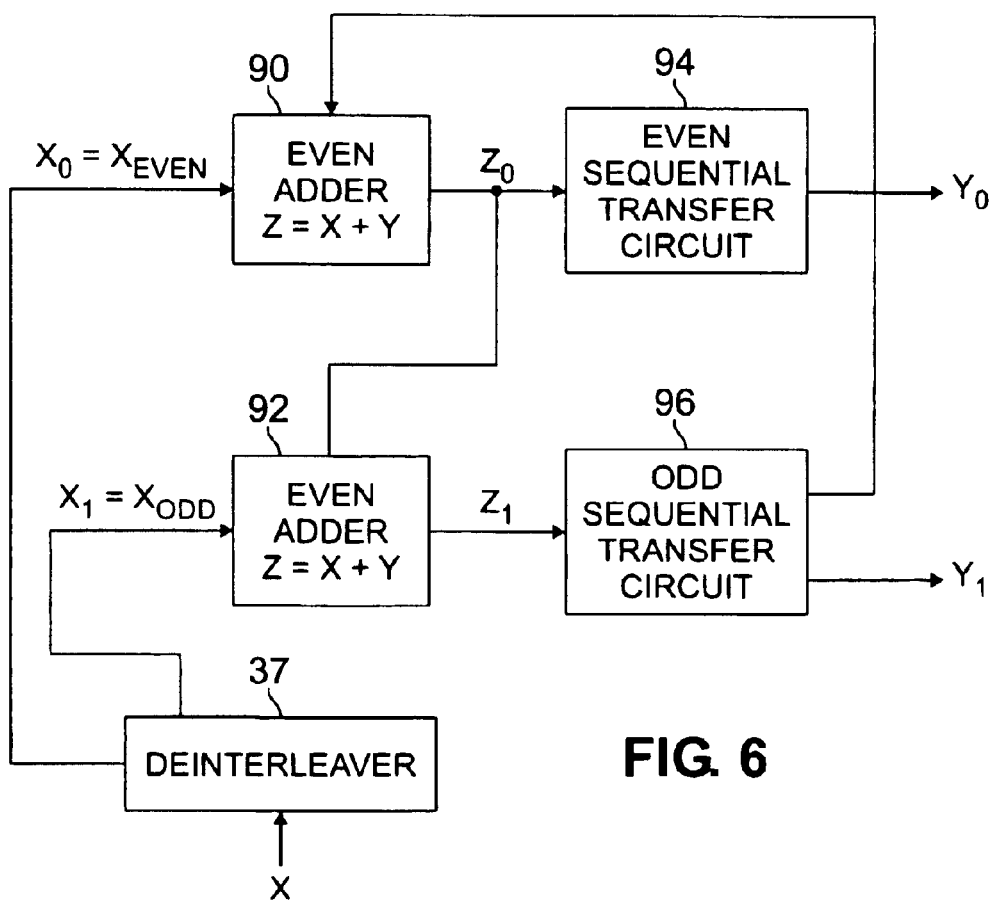
FIG. 6 is a block diagram of an exemplary half-rate clock digital circuit according to the teachings of the present invention.

FIGS. 5 and 6 present an example of a full-rate clock circuit and a corresponding half-rate clock circuit constructed according to the teachings of the present invention. Assume the requirement is for a simple integrator where, new_value=old_value+input value. The addition will be performed in an adder 80 (see FIG. 5), which is one example of a combinatorial function, such as the combinatorial function 30 of FIG. 2. The adder 80 performs the arithmetic addition operation on two input values (X,Y) and produces an output value Z. In a sequential transfer circuit 82, (which is one example of a register function, such as the register function 34 of FIG. 2), the input value (Z) is transferred to a register whose outputs are designated Y, and Y is fed back to the adder 80 since Y now represents the cumulative sum. Operation of the sequential transfer circuit occurs at the active edge of a full-rate clock signal input to the sequential transfer circuit 82. Thus the adder 80 and the sequential transfer circuit 82 implement the following operations.

$$Z=X+Y$$

$$Y \leftarrow Z \text{ (at the next clock edge)}$$

Let $X_0$ and $X_1$ represent two sequential input vectors to the FIG. 5 circuit. When $X_0$ is present at a first input terminal of the adder 80, the previous value of Y (designated $Y_1$) representing the cumulative sum to that point, is present at a second input terminal thereof. Thus the adder output is:

$$Z_0=X_0+Y_1.$$

$Z_0$, which represents the new cumulative sum, is supplied as input to the sequential transfer circuit 82, the output of which is $$Y_0 \leftarrow Z_0.$$

$Z_0=Y_0$ is also input to the adder 80 for summing with the next input value, $X_1$, which is now present at one input terminal of the adder 80. The result is $$Z_1=X_1+Y_0, \text{ and}$$

$$Y_1 \leftarrow Z_1$$

Thus in two successive full-rate clock cycles, two additions are performed, producing two cumulative sum output values ($Y_0$ and $Y_1$, wherein $Y_1$ is the most recent cumulative sum) from the sequential transfer circuit 82.

FIG. 6 illustrates the same operations as FIG. 5 using a half-rate clock circuit constructed according to the teachings of the present invention. Even adder 90 and odd adder 92 are functionally identical to the adder 80 of FIG. 5. Even and odd sequential transfer circuits 94 and 96, respectively, are functionally identical to the sequential transfer circuit 82 of FIG. 5, and both are responsive to a half-rate clock signal. The output vector from the even adder 90 is provided as an input to the odd adder 92 and to the even sequential transfer circuit 94. The output vector from the odd adder 92 is provided as an input to the odd sequential transfer circuit 96. A register feedback vector from the odd sequential transfer circuit 96 is input to the even adder 90. Block output vectors are taken from the block outputs of the even and odd sequential transfer circuits 94 and 96, respectively.

Two successive input vectors, designated $X_{even}$ and $X_{odd}$, or consistent with the nomenclature of FIG. 5, referred to as $X_0$ and $X_1$, are provided as inputs to the even and odd adders 90 and 92, respectively, through the deinterleaver 37. The output vectors are as follows:

From the even adder 90: $Z_0=X_0+Y_{-1}$

From the odd adder 92: $Z_1=X_1+Z_0$

The output vectors from the even and odd sequential transfer circuits 94 and 96 are:

From the odd sequential transfer circuit 94: $Y_0 \leftarrow Z_0$

From the even sequential transfer circuit 96: $Y_1 \leftarrow Z_1$

Interleaving the $Y_0$ and $Y_1$ vectors (taking $Y_0$ first) yields the same result as the full rate clock circuit of FIG. 4, that is, $Y_0$ is the first cumulative sum and $Y_1$ is the second, or more recent, cumulative sum.

Figure 7:
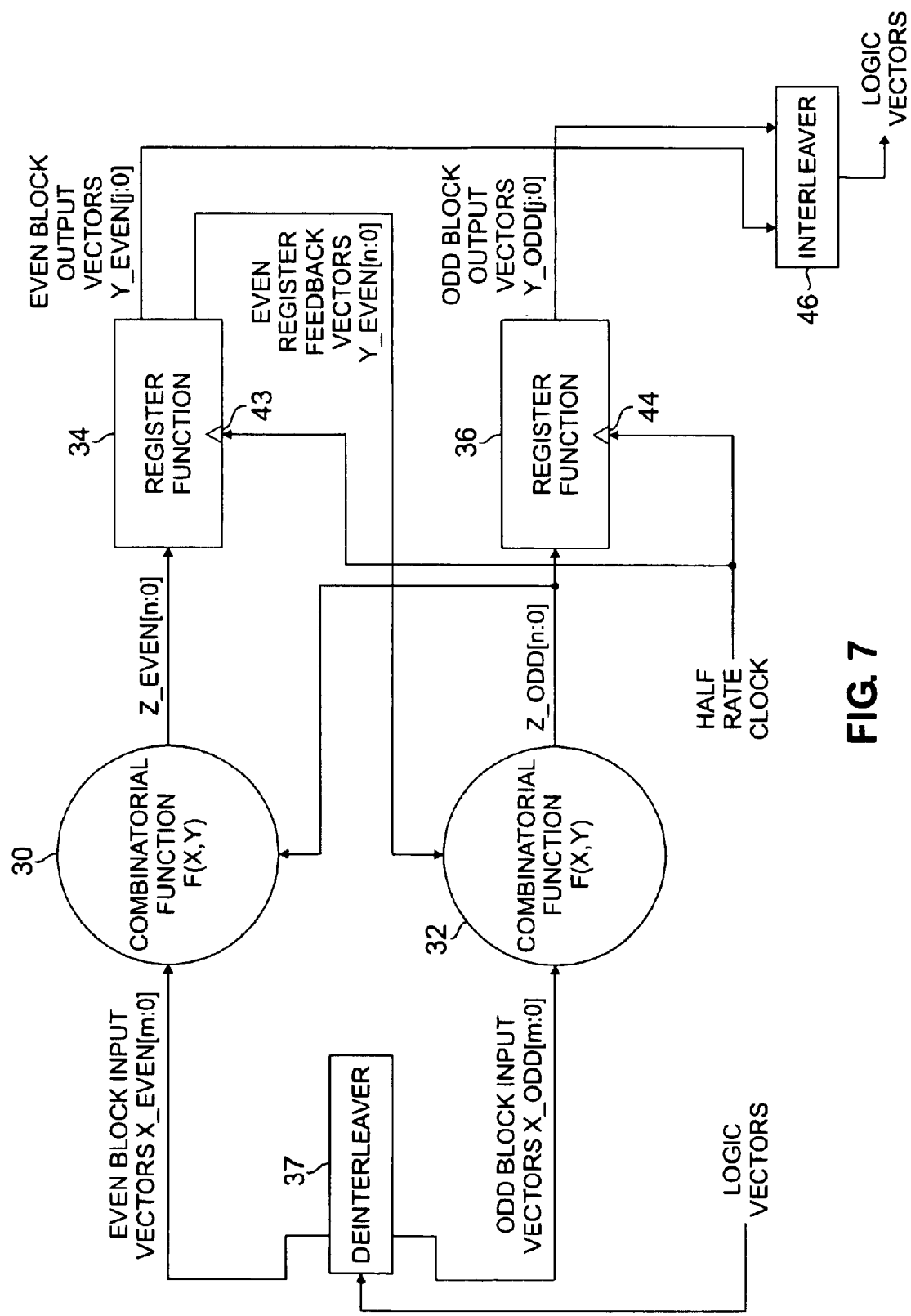
FIG. 7 is a block diagram of second embodiment of a half-rate clock digital circuit according to the teachings of the present invention.

FIG. 7 is a block diagram of an alternative half-rate clock digital circuit according to the teachings of the present invention. In the FIG. 7 embodiment, the even register feedback vectors are supplied as inputs to the combinatorial function 32. The output vectors from the combinatorial function 32 (Z_odd[n:0]) are input to the combinatorial function 30. The FIG. 7 embodiment operates similarly to the FIG. 2 embodiment, but the combinatorial function input vectors and the register feedback vectors are reversed in the FIG. 7 embodiment. The FIG. 7 embodiment can also be employed in a cascaded system similar to that illustrated in FIG. 4.

Figure 8:
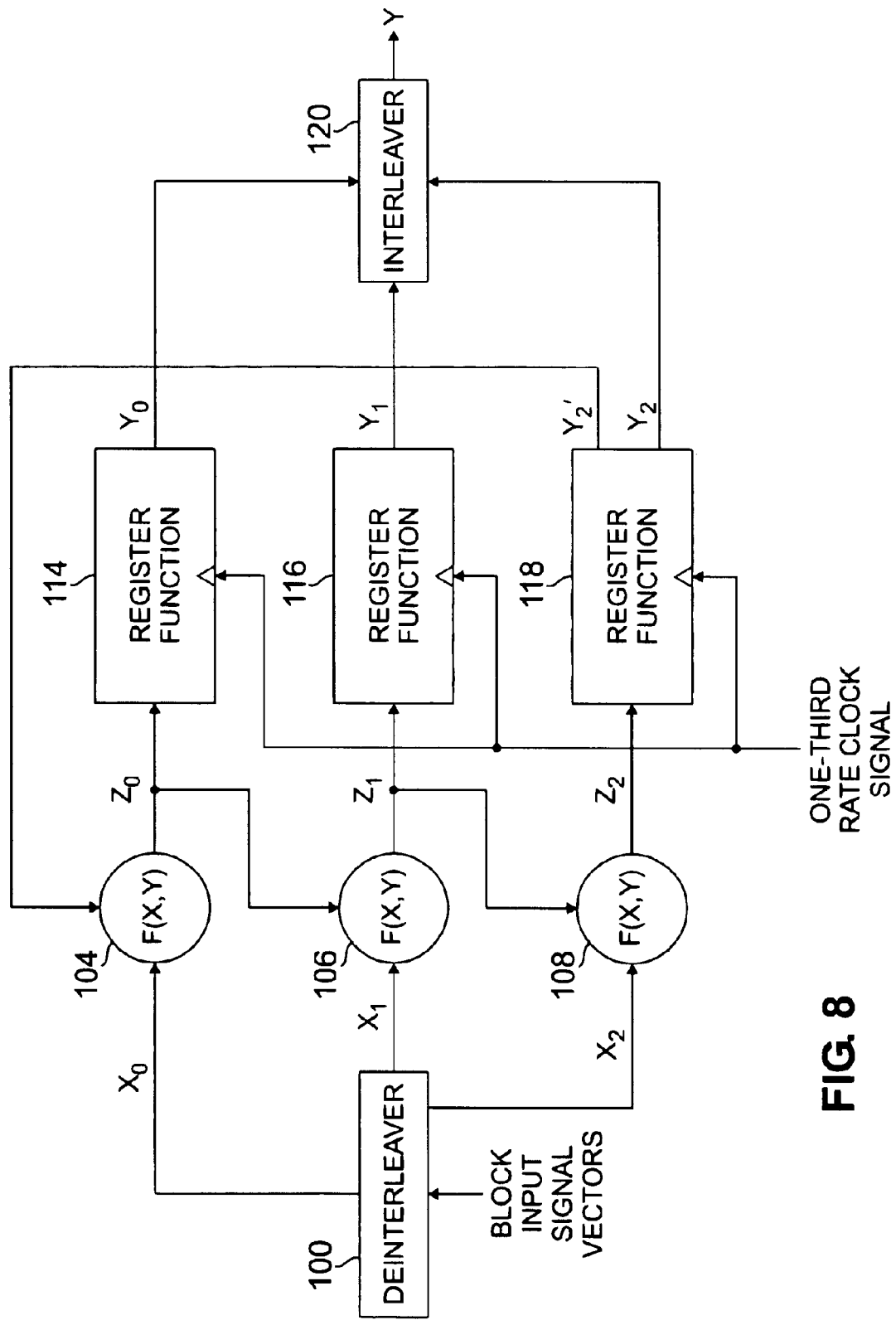
FIG. 8 is a block diagram of a fractional rate clock digital circuit according to the teachings of the present invention.

The method and apparatus of the present invention can also be extended to fractional clock rates other than the one-half clock rate described above. In an embodiment of a one-third clock rate circuit, illustrated in FIG. 8, a deinterleaver 100, in response to three consecutive full rate vectors $X_0$, $X_1$ and $X_2$ produces three simultaneous output vectors $X_0$, $X_1$, and $X_2$ that are supplied as inputs to identical combinatorial functions 104, 106 and 108 at one-third the full-rate clock. The output vector $Z_0$ from the combinatorial function 104 is supplied as an input to the combinatorial function 106; the output vector $Z_1$ from the combinatorial function 106 is supplied as an input to the combinatorial function 108 as shown. The output vectors $Z_0$, $Z_1$ and $Z_2$ are also supplied as inputs to register functions 114, 116 and 118, for producing block output vectors $Y_0$, $Y_1$ and $Y_2$. The register functions 114, 116 and 118 are responsive to a one-third clock rate signal. The register feedback vector $Y_2'$ is fed back to the combinatorial function 104. An interleaver 120 produces a full-rate vector Y in response to the one-third rate vectors $Y_0$, $Y_1$ and $Y_2$.

While the invention has been described with reference to preferred embodiments, it will be understood by those skilled in the art that various changes may be made and equivalent elements may be substituted for elements thereof without departing from the scope of the present invention. Further, the scope may include any combination of elements from the various embodiments set forth herein. In addition, modifications may be made to adapt a particular situation to the teachings of the present invention without departing from its essential scope. Therefore, it is intended that the invention not be limited to the particular embodiment disclosed as the best mode contemplated for carrying out this invention, but that the invention will include all embodiments falling within the scope of the appended claims.

What is claimed is:

1. A method for deriving a fractional-rate clocked logic circuit from a full-rate clocked logic circuit comprising combinatorial functions and sequential functions for operating on block input signals to produce block output signals, wherein the sequential functions operate at a full-rate clock frequency, the method comprising:

deriving combinatorial logic elements based on the combinatorial functions, each of the combinatorial logic elements responsive to a subset of the block input signals for producing combinatorial signals;

deriving sequential logic elements based on the sequential functions, each of the sequential logic elements responsive to a subset of the combinatorial signals and a fractional clock signal for producing register signals, wherein a frequency of the fractional clock signal is a fraction of the full rate clock frequency, and wherein at least one of the sequential logic elements further produces a register feedback signal;

wherein certain of the combinatorial logic elements are each further responsive to a subset of the combinatorial signals, and wherein at least one of the combinatorial logic elements is further responsive to the register feedback signal; and combining the register signals for producing the block output signals.

2. The method of claim 1 wherein the combinatorial logic elements are substantially identical, and wherein the sequential logic elements are substantially identical.

3. The method of claim 1 wherein each of the combinatorial logic elements implements a function F(X, Y), and wherein X and Y represent signals input to a combinatorial logic element and operated on by the function F( ).

4. The method of claim 3 wherein X comprises the subset of the block input signals, and wherein Y comprises the subset of the combinatorial signals.

5. The method of claim 1 wherein the block input signals and the block output signals each comprise signal vectors, and wherein each signal vector further comprises a plurality of logic signals.

6. The method of claim 1 further comprising segregating the block input signals into subsets of the block input signals by assigning each block input signal to one of the subsets of the block input signals.

7. A method for deriving a half-rate clocked logic circuit from a full-rate clocked logic circuit comprising combinatorial functions and sequential functions for operating on block input signals to produce block output signals, wherein the sequential functions operate at a full rate clock frequency, the method comprising:

forming a first and a second plurality of input signal groups in response to the block input signals;

forming a first combinatorial function element for receiving the first plurality of input signal groups and for producing first combinatorial signals;

forming a second combinatorial function element for receiving the second plurality of input signal groups and for producing second combinatorial signals;

forming a first sequential function element for receiving the first combinatorial signals and a half-rate clock signal for producing first register signals, wherein a frequency of the half-rate clock signal is about one-half of the full-rate clock frequency, forming a second sequential function element for receiving the second combinatorial signals and the half-rate clock signal, for producing second register signals and register feedback signals;

supplying the first combinational signals as an input to the second combinatorial function element;

supplying the register feedback signals as an input to the first combinatorial function element; and combining the first and the second register signals for producing the block output signals.

8. The method of claim 7 wherein a logic function implemented by the first and the second combinatorial function elements is substantially identical to the combinatorial functions.

9. The method of claim 7 wherein a logic function implemented by the first and the second sequential function elements is substantially identical to the sequential functions.

10. The method of claim 7 wherein the block input signals comprise a serial stream of logic signals, and wherein the step of forming the first and the second plurality of input signal groups further comprises forming the first and the second plurality of input signal groups from alternating logic signals in the stream of logic signals.

11. The method of claim 10 wherein the step of forming the first and the second plurality of input signal groups further comprises deinterleaving the serial stream of logic signals to form the first and the second plurality of input signal groups.

12. The method of claim 7 wherein the first and the second combinatorial function elements implement a function F(X, Y), and wherein X and Y represent signals input to a combinatorial function element operated on by the function F( ).

13. The method of claim 7 wherein the step of combining further comprises interleaving the first and the second register signals to produce the block output signals.

14. The method of claim 7 wherein the first plurality of input signal groups and the first register signals are even numbered signals, and wherein the second plurality of input signal groups and the second register signals are odd numbered signals.

15. The method of claim 7 wherein the block input signals and the block output signals each comprise signal vectors, and wherein each signal vector further comprises a plurality of logic signals.

16. The method of claim 7 wherein each one of the first plurality of input signal groups is earlier in time than the corresponding one of the second plurality of input signal groups.

17. A method for deriving a fractional-rate clocked logic circuit from a full-rate clocked logic circuit comprising combinatorial functions and full-rate sequential functions for operating on block input signals to produce block output signals, wherein the full-rate sequential functions operate at a full-rate clock frequency, the method comprising:

determining N, the reciprocal of the fractional rate;

segregating the block input signals into N signal groups;

providing each one of the N signal groups as an input to one of N combinatorial function elements, for producing N combinatorial signals;

providing one of the N combinatorial signals as an input to one of N sequential function elements, wherein each of the N sequential function elements produces register output signals, and wherein each of the N sequential function elements is responsive to a fractional clock rate signal, and wherein a frequency of the fractional clock signal is a fraction of the full-rate clock frequency;

wherein one of the N sequential function elements produces a register feedback signal;

wherein the nth combinatorial signal from each of the N combinatorial function elements is supplied as an input to the (n+1)th combinatorial function element, wherein n is between 0 and N−1;

wherein the register feedback signal is provided as an input to a first of the N combinatorial function elements; and combining the N register signals to form the block output signals.

18. A method for processing logic block input signals at a clock rate to produce logic block output signals, the method comprising:

forming input signal groups in response to the block input signals;

providing one of the input signal groups to one of a plurality of combinatorial function elements, wherein each combinatorial function element produces a combinatorial signal;

providing a combinatorial signal and a clock signal operative at the clock rate to one of a plurality of sequential function elements, wherein each sequential function element produces a register signal, and wherein at least one of the sequential function elements produces a register feedback signal;

further providing a combinatorial signal to certain ones of the plurality of combinatorial function elements;

providing the register feedback signal to at least one of the plurality of combinatorial function elements; and combining the register signals for producing the block output signals.

19. The method of claim 18 wherein the step of forming the input signal groups comprises alternatingly segregating the block input signals into one of the input signal groups.

20. The method of claim 18 wherein the step of combining the register signals comprises alternatingly combining the register signals for producing the block output signals.

21. A logic block for processing input signals and for producing output signals, comprising:

a deinterleaver for receiving and deinterleaving the input signals into a plurality of input signal groups;

a plurality of combinatorial function elements each one for receiving one of the plurality of input signal groups and for producing a combinatorial signal;

a plurality of sequential function elements each one for receiving a combinatorial signal group and a clock signal and for producing a register signal, wherein at least one of the plurality of sequential function elements produces a register feedback signal;

wherein each one of the plurality of combinatorial function elements further receives one of the combinatorial signals, and wherein at least one of the plurality of combinatorial function elements receives the register feedback signal;

an interleaver responsive to the register signals for producing the output signals.

22. A logic block for processing input signals and for producing output signals, comprising:

a deinterleaver for receiving and deinterleaving the input signals into alternating even and odd input signals;

an even combinatorial function element for receiving the even input signals and for producing even combinatorial signals;

an odd combinatorial function element for receiving the odd input signals and for producing odd combinatorial signals;

an even sequential function element for receiving the even combinatorial signals and a clock signal for producing even register signals;

an odd sequential function element for receiving the odd combinatorial signals and a clock signal for producing odd register signals and register feedback signals;

wherein the odd register feedback signals are supplied as an input to the even combinatorial function element;

wherein the even combinatorial signals are supplied as an input to the odd combinatorial function element;

an interleaver for receiving the even and odd register signals for producing the output signals.

23. A logic block for processing input signals and for producing output signals, comprising:

a deinterleaver for receiving and deinterleaving the input signals into alternating even and odd input signals;

a first even combinatorial function element for receiving the even input signals and for producing first even combinatorial signals;

a first odd combinatorial function element for receiving the odd input signals and for producing first odd combinatorial signals;

a first odd sequential function element for receiving the first odd combinatorial signals and a clock signal, for producing first odd register signals and first odd register feedback signals;

wherein the first odd register feedback signals are supplied as an input to the first even combinatorial function element;

wherein the first even combinatorial signals are supplied as an input to the first odd combinatorial function element;

a second even combinatorial function element for receiving the first odd register signals and for producing even block output signals;

a second odd combinatorial function element for receiving the first even combinatorial signals and the even block output signals and for producing second odd combinatorial signals;

a second odd sequential function responsive to the second odd combinatorial signals and the clock signal for producing odd block signals and second odd register feedback signals;

wherein the second odd register feedback signals are supplied as an input to the second even combinatorial function;

an interleaver for receiving the even and odd block signals for producing the output signals.

* * * * *